(12) United States Patent
Oya et al.

(10) Patent No.: US 11,397,821 B2
(45) Date of Patent: Jul. 26, 2022

(54) REMOTE ACCESS CONTROL SYSTEM

(71) Applicants: KABUSHIKI KAISHA TOSHIBA, Minato-ku (JP); TOSHIBA DIGITAL SOLUTIONS CORPORATION, Kawasaki (JP)

(72) Inventors: Toshiharu Oya, Edogawa (JP); Tatsuyuki Matsushita, Nerima (JP); Tatsuro Ikeda, Fuchu (JP); Fangming Zhao, Fuchu (JP)

(73) Assignees: KABUSHIKI KAISHA TOSHIBA, Minato-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 243 days.

(21) Appl. No.: 16/641,036

(22) PCT Filed: Mar. 28, 2018

(86) PCT No.: PCT/JP2018/012734
§ 371 (c)(1),
(2) Date: Feb. 21, 2020

(87) PCT Pub. No.: WO2019/058612
PCT Pub. Date: Mar. 28, 2019

(65) Prior Publication Data
US 2021/0019431 A1  Jan. 21, 2021

(30) Foreign Application Priority Data

Sep. 25, 2017  (JP) .............................. JP2017-183491

(51) Int. Cl.
*G06F 21/60* (2013.01)
*H04L 29/08* (2006.01)
(Continued)

(52) U.S. Cl.
CPC ............. *G06F 21/606* (2013.01); *H04B 7/15* (2013.01); *H04L 61/2503* (2013.01); *H04L 67/141* (2013.01); *H04L 12/66* (2013.01)

(58) Field of Classification Search
CPC ....... G06F 21/606; G06F 21/305; H04B 7/15; H04L 67/141; H04L 63/0272; H04L 12/66; H04L 61/2503
(Continued)

(56) References Cited

U.S. PATENT DOCUMENTS 8,132,242 B1 * 3/2012 Wu ..................... H04L 63/0884
726/8
2007/0058644 A1 * 3/2007 Brahmbhatt .......... H04L 63/029
370/401

(Continued)

FOREIGN PATENT DOCUMENTS

| CN | 105262716 A | 1/2016 |
| JP | 2010-206442 A | 9/2010 |

(Continued)

OTHER PUBLICATIONS

International Search Report dated Jun. 19, 2018 in PCT/JP2018/012734 filed on Mar. 28, 2018, citing documents AR and AX therein, 1 page.

(Continued)

Primary Examiner — Ruolei Zong
(74) Attorney, Agent, or Firm — Oblon, McClelland, Maier & Neustadt, L.L.P.

(57) ABSTRACT

A remote access control system includes a remote access control apparatus and a communication relay apparatus. The remote access control apparatus is configured to establish a predetermined communication session with the communication relay apparatus through predetermined connection target information obtaining processing performed by active (Continued)

connection to the remote access control apparatus from the communication relay apparatus, to transmit a secure communication connection start command to the communication relay apparatus, to receive a secure communication connection request from the communication relay apparatus to perform processing for establishing a first secure communication session, and to receive a secure communication connection request from the user apparatus based on the result of the establishment of the first secure communication session to perform processing for establishing a second secure communication session. The connection between the individually established secure communication sessions is determined based on session connection permission information to relay the secure communication sessions.

10 Claims, 8 Drawing Sheets

(51) Int. Cl.
  *H04L 29/12* (2006.01)
  *H04B 7/15* (2006.01)
  *H04L 61/2503* (2022.01)
  *H04L 67/141* (2022.01)
  *H04L 12/66* (2006.01)

(58) Field of Classification Search
  USPC .......................................................... 726/26
  See application file for complete search history.

(56) References Cited

U.S. PATENT DOCUMENTS

| | | |
|---|---|---|
| 2008/0098472 A1 | 4/2008 | Enomoto et al. |
| 2013/0060942 A1* | 3/2013 | Ansari ................... H04L 12/66 709/225 |
| 2013/0081132 A1 | 3/2013 | Lee et al. |
| 2013/0239172 A1 | 9/2013 | Murakami et al. |
| 2014/0289830 A1* | 9/2014 | Lemaster ............... H04L 63/08 726/7 |
| 2017/0188399 A1 | 6/2017 | Nagano et al. |
| 2017/0207921 A1 | 7/2017 | Rantapuska et al. |
| 2018/0247029 A1* | 8/2018 | Fish ........................ G16H 15/00 |
| 2018/0248850 A1* | 8/2018 | Tee .......................... H04L 69/16 |

FOREIGN PATENT DOCUMENTS

| | | |
|---|---|---|
| JP | 2011-55187 A | 3/2011 |
| JP | 5133932 B2 | 1/2013 |
| JP | 5494816 B2 | 5/2014 |
| JP | 2016-116112 A | 6/2016 |
| WO | WO 2016/207927 A1 | 12/2016 |

OTHER PUBLICATIONS

Nobori, D. Y., "Relay communication with VPN Azure," <URL>http://d.hatena.ne.jp/softether/touch/20121128/p4, Nov. 2012 (with unedited computer generated English translation) (Total 4 pages).

* cited by examiner

REMOTE ACCESS CONTROL SYSTEM

TECHNICAL FIELD

Embodiments of the present invention relate to a technique for remote access from a user apparatus to a device located at a distant place.

BACKGROUND ART

Remote access has conventionally been performed to remotely operate a device located at a distant place, diagnose or know its operational status, and collect data from the device such as its operational history. The remote access to a device located at a distance place employs a secure communication technology, for example VPN (Virtual Private Network).

PRIOR ART DOCUMENTS

Patent Documents

[Patent Document 1] Japanese Patent No. 5494816
[Patent Document 2] Japanese Patent No. 5133932

DISCLOSURE OF THE INVENTION

Problems to be Solved by the Invention

It is an object of the present invention to provide a remote access control system for controlling remote access over secure communication to each of connection targets located at different distant places.

Means for Solving the Problems

According to embodiments, a remote access control system for controlling remote access to each of connection targets located at distant places over secure communication includes a remote access central apparatus connected to a user apparatus; and a communication relay apparatus under control of a network device and belonging to a local network including a remote operation target device located at each of the connection targets, the network device being configured to perform network address translation between a network associated with the remote access control apparatus and the local network. The remote access control apparatus includes a communication session maintaining section configured to establish a predetermined communication session with the communication relay apparatus located at the connection target through predetermined connection target information obtaining processing performed by active connection to the remote access control apparatus from the communication relay apparatus; a command delivery section configured to transmit a secure communication connection start command to the communication relay apparatus with the predetermined communication session maintained; a secure communication control section configured to receive a secure communication connection request transmitted from the communication relay apparatus based on the secure communication connection start command to perform processing for establishing a first secure communication session between the communication relay apparatus and the remote access control apparatus, and to receive a secure communication connection request transmitted from the user apparatus based on a result of the establishment of the first secure communication session to perform processing for establishing a second secure communication session between the user apparatus and the remote access control apparatus; and a secure communication session connection section configured to perform determination of permission of connection between the individually established first secure communication session and second secure communication session based on session connection permission information indicating permission of session connection between the user apparatus or a user of the user apparatus and the connection target, and to connect the first secure communication session and the second secure communication session based on a result of the determination to perform relay of the secure communication sessions.

MODE FOR CARRYING OUT THE INVENTION

Embodiments of the present invention will hereinafter be described with reference to the accompanying drawings.

Embodiment 1

Figure 1:
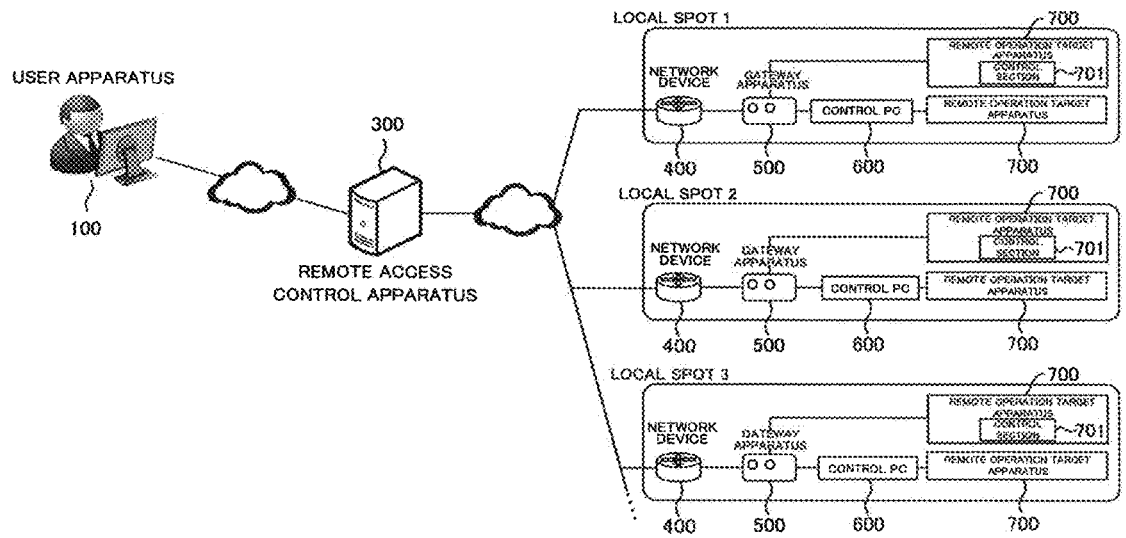
FIG. 1 A diagram showing the network configuration of a remote access control system according to Embodiment 1.

FIGS. 1 to 6 are diagrams showing a remote access control system according to Embodiment 1. FIG. 1 is a diagram showing the network configuration thereof. The remote access control system according to Embodiment 1 includes a remote access control apparatus 300 connected to a gateway apparatus (communication relay apparatus) 500 for relaying communication to a remote operation target device 700 located at a distance place (local spot).

As shown in FIG. 1, in Embodiment 1, a local network including the gateway apparatus 500 and the remote operation target device 700 under control of a network device 400 is constructed at each of a plurality of distant places, and the remote access control apparatus 300 can be connected to each of the plurality of local networks located at the distant places. A user connects to one or more of the local networks through the remote access control apparatus 300 and performs remote operation of the remote operation target device 700 from a user device 100. The user device 100 is a computer apparatus for remotely operating the remote operation target device 700.

The remote operation target device 700 can be controlled by a control PC 600, and in this case, the user apparatus 100 can connect to the control PC 600 and indirectly perform remote operation of the remote operation target device 700 through the control PC 600. Alternatively, the remote operation target device 700 can include a control section 701 such that remote operation of the remote operation target device 700 can be directly performed by the control section 701 without using the control PC 600.

The remote operation target device 700 is a monitor target device such as a factory or a monitoring apparatus for monitoring such a monitor target device, by way of example. Examples of the monitor target device include a control apparatus for a plant and a management server for a designated system, and examples of the monitoring apparatus include a monitoring camera. Other examples include a user device such as a home electric appliance and household equipment such as cooling and heating, bathroom, and light equipment.

The remote operation target device 700 receives a remote command input from the user apparatus 100 and performs processing according to the remote command. For example, the control section 701 of the remote operation target device 700 performs maintenance processing based on the remote command including diagnostic processing for diagnosing the operational status of the remote operation target device 700 to output the diagnosis result or collecting and outputting log information such as the operational history. When the remote operation target device 700 is a monitor camera, for example, a command can be output to a camera control section of the remote operation target device 700 to perform operation according to the remote command including taking moving or static images, outputting the taken images, or changing the imaging direction with a pan/tilt mechanism.

Figure 2:
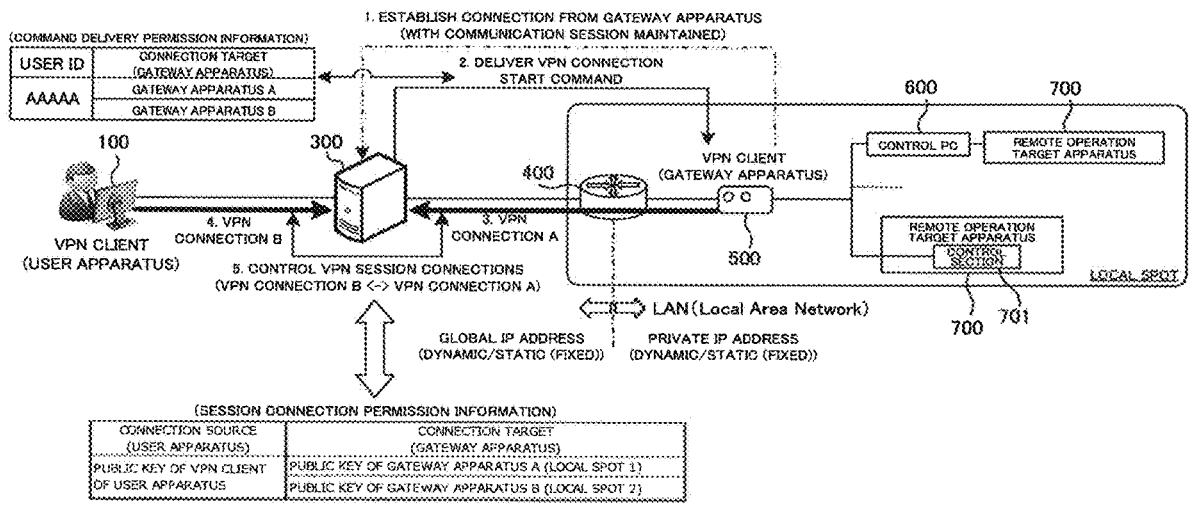
FIG. 2 A diagram for explaining a local network environment and processing for connecting secure communication sessions in the remote access control system according to Embodiment 1.

FIG. 2 is a diagram for explaining a local network environment and processing for connecting secure communication sessions in the remote access control system. The network (NW) device 400 is a network device such as a router and has a network address translation function with NAT (Network Address Translation) or NAPT (Network Address Port Translation). The network device 400 is assigned a dynamic or static (fixed) global IP address provided by an ISP.

The gateway apparatus 500 and the remote operation target device 700 (including the control PC 600) are connected in a Local Area Network under control of the network device 400 at a local spot. The gateway apparatus 500 is a gateway connected to one or more of the remote operation target devices 700 within the same segment and located between the remote operation target device 700 and the remote access control apparatus 300.

In the local LAN environment, each of the gateway apparatus 500, the remote operation target device 700, and the control PC 600 is assigned a dynamic or static (fixed) private IP address. The private IP address is arbitrarily determined in the local LAN environment. The gateway apparatus 500 is connected to the remote operation target device 700 in a wireless LAN/wired LAN, and the gateway apparatus 500 and the remote operation target device 700 are connected over TCP/IP.

The network device 400 performs translation between the global IP address and the private IP address to allow the gateway apparatus 500 within the LAN controlled thereby to connect to the remote access control apparatus 300 over an IP network. In the NAT, one global IP address is fixedly translated into one private IP address assigned to the gateway apparatus 500. In contrast, in the NAPT, one global IP address is shared by a plurality of devices in combination with port numbers (called an IP masquerade technique) to allow apparatuses other than the gate ay apparatus 500 within the LAN controlled thereby to connect to the IP network simultaneously.

The remote access control apparatus 300 performs secure communication connection to the gateway apparatus 500 under control of the network device 400. However, the gateway apparatus 500 is in a local environment in which it is assigned the private IP address under control of the network device 400. For this reason, the gateway apparatus 500 is an uncertain (unknown) destination from the remote access control apparatus 300. Thus, the remote access control apparatus 300 cannot actively connect to the gateway apparatus 500.

To address this, the remote access control system according to Embodiment 1 performs connection target information obtaining processing for obtaining connection target information of the gateway apparatus 500 as an uncertain destination to establish connection between the remote access control apparatus 300 and the gateway apparatus 500, and maintains a communication session between them, and then performs secure communication connection.

Figure 3:
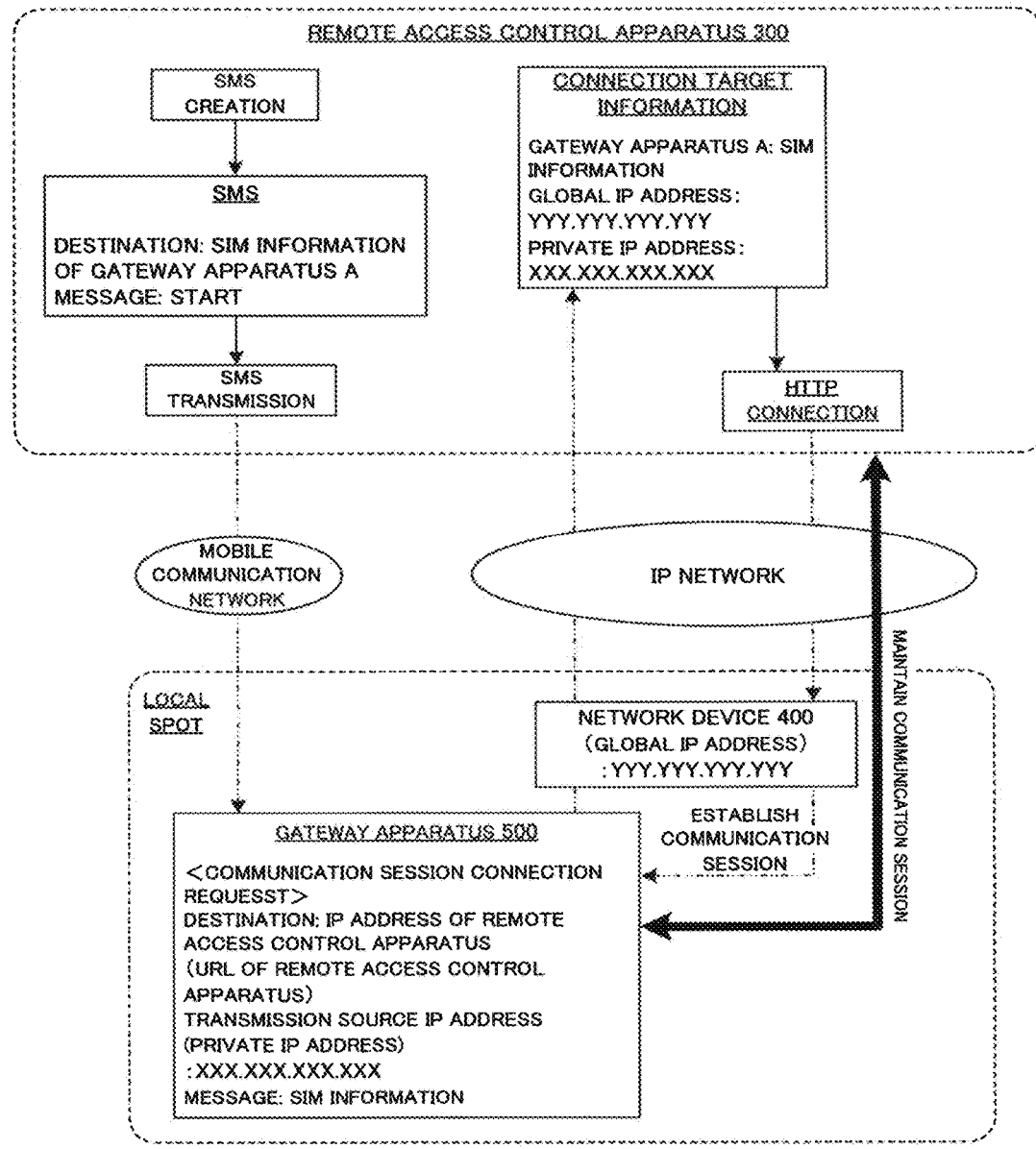
FIG. 3 A diagram for explaining connection information obtaining processing performed on a gateway apparatus in the remote access control system according to Embodiment 1.

FIG. 3 is a diagram for explaining the connection information obtaining processing performed on the gateway apparatus 500 as an uncertain destination. The gateway apparatus 500 can include a communication apparatus capable of connecting to a mobile communication network (for example, a mobile telephone network (carrier network) including 3G channel such as W-CDMA or GSM). The gateway apparatus 500 includes recording medium (SIM (Subscriber Identity Module) Card) which records a unique ID number (IMSI (International Mobile Subscriber Identity)) for specifying a subscriber of the mobile communication network, and the unique ID number is linked to a telephone number. The remote access control apparatus 300 can send a message to the telephone number and/or the unique ID number (hereinafter referred to as SIM information) of the gateway apparatus 500 as a destination over the mobile communication network.

In the mobile communication network, SMS (Short Message Service) can be used. The remote access control apparatus 300 can send an SMS message directly to the gateway apparatus 500 over the mobile communication network by designating the SIM information of the gateway apparatus 500 as a destination.

Upon reception of the SMS message from the remote access control apparatus 300 over the mobile communication network, the gateway apparatus 500 actively performs processing for connecting to the remote access control apparatus 300 over the IP network.

Specifically, the gateway apparatus 500 creates, in response to the reception of the SMS message, a communication session connection request including the SIM information of the gateway apparatus 500 by setting the IP address of the remote access control apparatus 300 as a destination and the private IP address of the gateway apparatus 500 as a transmission source IP address. The gateway apparatus 500 transmits the communication session connection request to the network device 400, and the network device 400 performs network address translation processing with NAT or NAPT using the global IP address assigned thereto and transmits the communication session connection request to the remote access control apparatus 300.

The remote access control apparatus 300 can store the transmission source IP address and the global IP address included in the received session connection request as connection target information of the gateway apparatus 500 and use the connection target information to establish a communication session with the gateway apparatus 500 in a communication scheme such as HTTP or WebSocket.

It should be noted that a known technique other than the configuration and processing for obtaining the connection target information shown in FIG. 3 can be used to obtain the connection target information of the gateway apparatus 500 as an uncertain destination. For example, the gateway apparatus 500 can connect to the remote access control apparatus 300 at a predetermined time or at predetermined time intervals and notify the remote access control apparatus 300 of the connection target information.

As described above, in Embodiment 1, the connection target information obtaining processing for obtaining the connection target information of the gateway apparatus 500 as an uncertain destination is performed, and then the secure communication connection is performed with the gateway apparatus 500 identified as a destination.

An example of the secure communication in Embodiment 1 is VPN (Virtual Private Network) connection. The VPN includes Internet VPN and IP-VPN. The Internet VPN includes IPsec (IP Security Architecture)-VPN which employs IPsec for a security protocol and SSL (Secure Sockets Layer)-VPN which employs SSL for a security protocol. IP-VPN includes MPLS (Multi Protocol Label Switching)-VPN with MPLS in a private IP network of a communication provider (closed network dedicated to a communication provider).

While Embodiment 1 is described with the VPN connection used as an example of the secure communication, the present invention is not limited thereto. Various security technologies (security protocols) are applicable such as tunneling, encryption, and authentication using public keys or secret keys as long as a secure communication form is used. Websocket communication using SSL is another example of such a secure communication form.

After the communication session with the gateway apparatus 500 is established, the remote access control apparatus 300 delivers a VPN connection start command to the gateway apparatus 500. A trigger for delivering the VPN connection start command is, for example, the time when a remote access request for a certain local spot is received from the user apparatus 100. Upon reception of the VPN connection start command, the gateway apparatus 500 actively transmits a VPN connection request to the remote access control apparatus 300 and establishes a VPN connection A with the remote access control apparatus 300.

After the VPN connection A is established between the remote access control apparatus 300 and the gateway apparatus 500, the user apparatus 100 actively transmits a VPN connection request to the remote access control apparatus 300 based on the result of the establishment of the VPN connection A and establishes a VPN connection B with the remote access control apparatus 300.

The remote access control apparatus 300 establishes the VPN connection A and the VPN connection B independently, and performs processing for determining connection permission between the independently established VPN connections A and B. By way of example, as shown in FIG. 2, session connection permission information including a connection source associated with a connection target is previously set. For example, the session connection permission information can be set by pairing a public key of a VPN client of the user apparatus 100 with a public key of a VPN client of the gateway apparatus 500 which is a connection target to be permitted. The remote access control apparatus 300 determines whether or not the independently established VPN connections A and B correspond to the permitted pair registered in the session connection permission information, and when they correspond to the permitted pair, performs communication session relay over the secure communication for relaying sessions between the VPN connections A and B. This allows the user apparatus 100 to perform remote operation of the remote operation target device 700 through the remote access control apparatus 300.

It should be noted that the session connection permission information may be any combination of information pieces capable of uniquely identifying the independently established secure communications between the remote access control apparatus 300 and the gateway apparatus 500 and between the remote access control apparatus 300 and the user apparatus 100, and the information uniquely identifying the secure communication may be any information other than the public key that is capable of specifying a connection target. For example, a public key of a connection target, a certificate for verifying the public key of the connection target, a secret key of the apparatus, an IP address or a MAC address, or a URL can be used as the information uniquely identifying the secure communication.

In the remote access control system according to Embodiment 1, the remote access from the user apparatus 100 to each of different distant places is controlled such that the secure communication connection is established actively from the connection target desired by the user and any unnecessary secure communication connection is not performed with any connection target. This can eliminate the need to maintain a secure communication connection with each of the plurality of distant places, thereby reducing resources and communication cost.

In addition, after the connection target information obtaining processing for obtaining the connection target information of the gateway apparatus 500 within the local network under control of the network device 400 is performed, and with the predetermined communication session established accordingly, the secure communication is established. Thus, the secure communication can be established with the gateway apparatus 500 assigned the private IP address within the local network and regarded as an uncertain destination from outside the local network.

Figure 4:
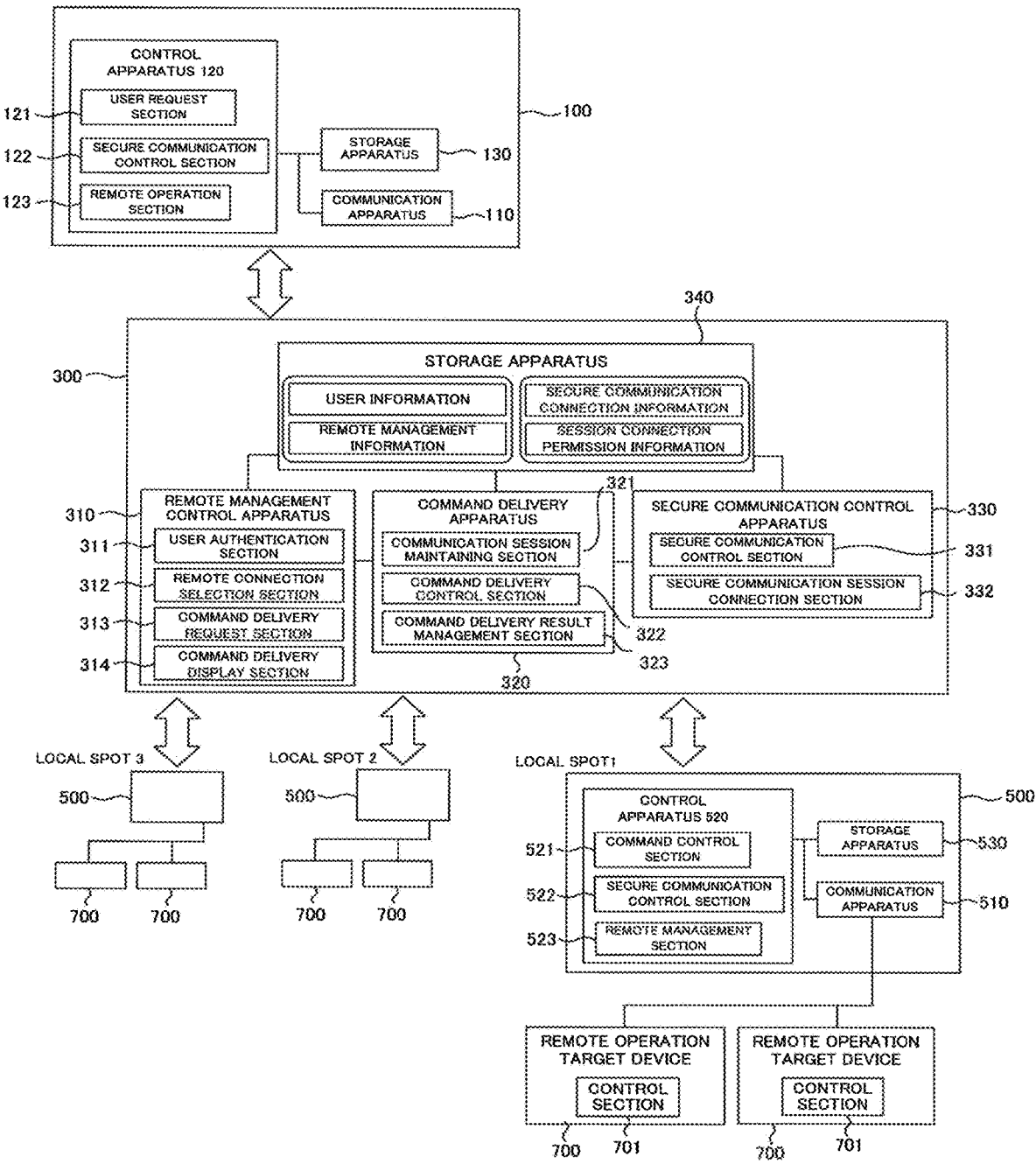
FIG. 4 A functional block diagram showing apparatuses constituting the remote access control system according to Embodiment 1.

FIG. 4 is a functional block diagram showing apparatuses constituting the remote access control system. The user apparatus 100 includes a communication apparatus 110, a control apparatus 120, and a storage apparatus 130. The control apparatus 120 includes a user request section 121, a secure communication control section 122, and a remote operation section 123. The secure communication control section 122 is a VPN client (secure communication client)

on the user side. The storage apparatus 130 stores, as secure communication connection information, a public key of a connection target (remote access control apparatus 300), a certificate for verifying the public key of the connection target (remote access control apparatus 300), a secret key of the user apparatus 100, a destination (IP address or URL) of a secure communication control apparatus 330 of the remote access control apparatus 300 and the like.

The remote operation section 123 is, for example, a VNC (Virtual Network Computing) client using RFB (Remote Frame Buffer) protocol for the control PC 600 or a remote desktop client using RDP (Remote Desktop Protocol) and provides a predetermined remote control function. The remote operation section 123 can provide a remote control function such as SSH (Secure Shell) for the remote operation target device 700.

The remote access control apparatus 300 includes a remote management control apparatus 310, a command delivery apparatus 320, the secure communication control apparatus 330, and a storage apparatus 340.

The remote management control apparatus 310 includes a user authentication section 311 for providing an interface function to the user apparatus 100 to perform user authentication and a remote connection selection section 312 for providing a function of selecting a connection target (gateway apparatus 500 at each of a plurality of different distant places) desired by the user. The remote management control section 310 also includes a command delivery request section 313 for outputting a command delivery request to the command delivery apparatus 320 based on the selection of a connection target (remote connection request) and a command delivery display section 314 for providing the user with a command delivery result output from the command delivery apparatus 320.

The command delivery apparatus 320 includes a communication session maintaining section 321, a command delivery control section 322, and a command delivery result management section 323. The communication session maintaining section 321 performs the connection target information obtaining processing described above on the selected gateway apparatus 500 (local spot). In the example of FIG. 3, the communication session maintaining section 321 can have an SMS creation function, an SMS transmission function, and a predetermined communication session establishment/maintaining function based on the connection target information obtained from the gateway apparatus 500.

The command delivery control section 322 transmits a secure communication connection start command to the gateway apparatus 500 while the communication session maintaining section 321 maintains a predetermined communication session with the gateway apparatus 500. The communication session maintaining section 321 and the command delivery control section 322 can perform each processing in response to the command delivery request received from the remote management control apparatus 310.

The command delivery result management section 323 outputs the result of secure communication establishment received from the gateway apparatus 500 to the command delivery display section 314 of the remote management control apparatus 310 as a command delivery result. The user can know from the command delivery result provided by the command delivery display section 314 that the selected connection target and the remote access control apparatus 300 are connected to each other over the secure communication. In response thereto, the user transmits a secure communication connection request to the remote access control apparatus 300 in order to connect the user apparatus 100 to the remote access control apparatus 300 over the secure communication.

The secure communication control apparatus 330 includes a secure communication control section 331 and a secure communication session connection section 332. The secure communication control section 331 performs first processing for establishing a secure communication session with a secure communication control section 522 of the gateway apparatus 500 and second processing for establishing a secure communication session with the secure communication control section 122 of the user apparatus 100. Each of the first processing and the second processing is passive-type processing performed in response to the secure communication connection requests from the gateway apparatus 500 and the user apparatus 100, and the remote access control apparatus 300 does not actively establish any secure communication connection to the gateway apparatus 500 or the user apparatus 100.

The secure communication session connection section 332 performs the connection permission determination processing based on the session connection permission information illustrated in FIG. 2 and performs relay between the permitted secure communication sessions.

The storage apparatus 340 stores user information, remote management information, secure communication connection information, and the session connection permission information. The user information includes user authentication information such as a user ID and a password, and user attribute information (company name, department, access authority or the like). The remote management information includes information about each of connection targets obtained through the connection target information obtaining processing (destination of each gateway apparatus 500 in the local network), equipment information about the remote operation target device 700 at each local spot and the like. The remote management information also includes command delivery permission information in which each user apparatus 100 or each user of the user apparatus 100 is associated with a plurality of connection targets. For example, as shown in FIG. 2, the command delivery permission information includes the user ID linked to the associated connection targets.

The secure communication connection information stores a public key of a first connection target (user apparatus 100), a certificate for verifying the public key of the first connection target (user apparatus 100), a public key of a second connection target (each gateway apparatus 500), a certificate for verifying the public key of the second connection target (each gateway apparatus 500), a secret key of the remote access control apparatus 300 and the like. As illustrated in FIG. 2, the session connection permission information stores a combination of information pieces for permitting the session connection between first secure communication from the gateway apparatus 500 to the remote access control apparatus 300 and second secure communication from the user apparatus 100 to the remote access control apparatus 300.

The gateway apparatus 500 includes a communication apparatus 510, a control apparatus 520, and a storage apparatus 530. The control apparatus 520 includes a command control section 521, the secure communication control section 522, and a remote management section 523.

Upon reception of the secure communication connection start command from the remote access control apparatus 300, the command control section 521 outputs a secure communication start instruction to the secure communication control section 522. When the secure communication control section 522 establishes secure communication to the remote access control apparatus 300, the command control section 521 transmits the result of the secure communication establishment to the remote access control apparatus 300 (command delivery apparatus 320).

The command control section 521 can have a function corresponding to the function of the communication session maintaining section 321 of the remote access control apparatus 300 described above. In the example of FIG. 3, the communication apparatus 510 of the gateway apparatus 500 is connectable to the mobile communication network and includes previously stored SIM information. The command control section 521 can have a communication session maintaining function of receiving the SMS message, creating and transmitting the communication session connection request to the remote access control apparatus 300. The communication session connection request includes the connection target information shown in the example of FIG. 3. It should be noted that the communication session maintaining function can also be realized by providing a processing section separate from the command control section 521.

The secure communication control section 522 is a VPN client (secure communication client) on the local spot side, and actively performs secure communication session establishment processing on the remote access control apparatus 300 based on the secure communication start instruction from the command control section 521 in response to the reception of the secure communication connection start command.

The remote management section 523 establishes a connection to the remote operation target device 700 or the control PC 600 connectable over a wireless or wired LAN, relays and outputs a remote instruction received from the user apparatus 100 to the remote operation target device 700 or the control PC. The remote management section 523 receives various types of information or the processing result output from the remote operation target device 700 or the control PC and transmits them to the remote access control apparatus 300 through the secure communication control section 522.

The storage apparatus 530 stores, as secure communication connection information, a public key of a connection target (remote access control apparatus 300), a certificate for verifying the public key of the connection target (remote access control apparatus 300), a secret key of the gateway apparatus 500, a destination (IP address or URL) of the secure communication control apparatus 330 of the remote access control apparatus 300 and the like.

Figure 5:
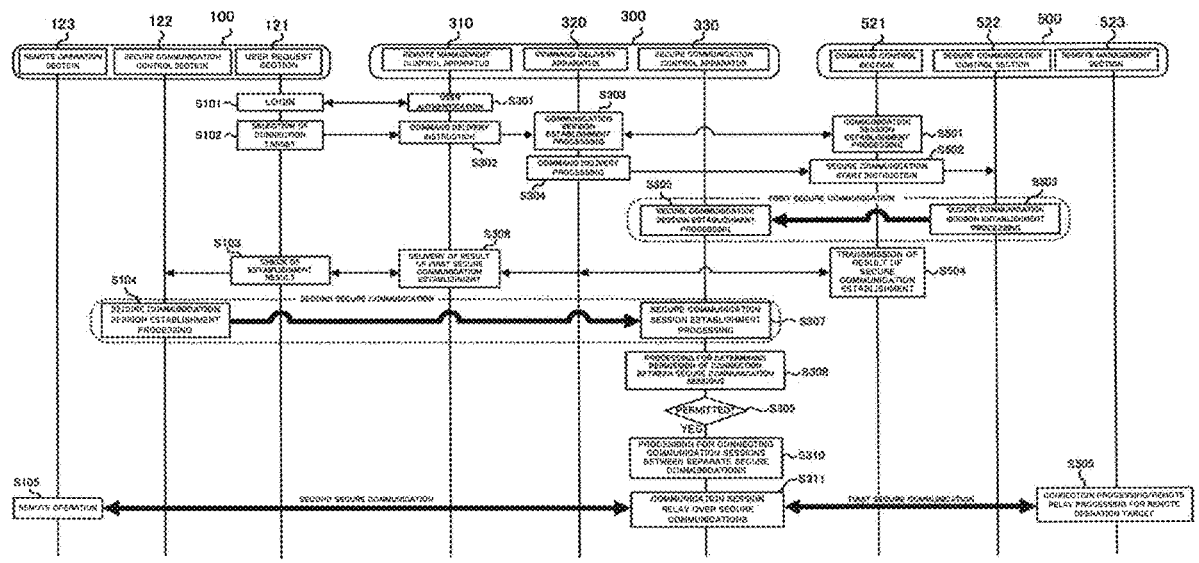
FIG. 5 A flow chart showing processing for establishing and processing for relaying secure communication sessions in the remote access control system according to Embodiment 1.

FIG. 5 is a flow chart showing processing for establishing and processing for relaying secure communication sessions in the remote access control system according to Embodiment 1.

The user connects to the remote access control apparatus 300 from the user apparatus 100. The user request section 121 is a browser, for example, and displays a login screen provided by the user authentication section 311. The user inputs the user ID and the password to the log-in screen, and the user request section 121 transmits the input user ID and password to the user authentication section 311. The user authentication section 311 refers to the user information to perform user authentication (S101, S301).

When the user authentication is successfully performed, the remote connection selection section 312 transmits a predetermined screen for selecting a connection target (local spot or gateway apparatus 500) to the user request section 121. The user can directly input the name of a connection target to the screen or select a desired connection target from a list of connection targets previously created based on the command delivery permission information (S102).

As described above, connection targets accessible from the user are previously determined by the command delivery permission information. Thus, the remote connection selection section 312 can refer to the command delivery permission information of the authenticated user and control the connection target selection to be performed from the accessible connection targets. Alternatively, the remote connection selection section 312 can perform control such that each user can connect only to one particular connection target, and in this case, the selection operation performed by the user can be omitted. It is also possible to previously determine connection targets accessible from a user terminal such as the user apparatus 100, not from the user.

The remote connection selection section 312 can also perform control such that a new connection target for each user can be registered in the command delivery permission information and the session connection permission information. For example, on a predetermined screen for selecting a connection target, the user can register/update a new connection target to update the command delivery permission information and the session connection permission information or a predetermined manager can register/update the command delivery permission information and the session connection permission information of each user. In addition, based on information (for example, a connection target newly inked to the user ID) registered in the command delivery permission information, it is possible to automatically register information such as a public key for specifying a device of that connection target (communication relay apparatus) in the session connection permission information.

When the user selects the connection target, the command delivery request section 313 outputs a command delivery request for the selected connection target to the command delivery apparatus 320 (S302). The communication session maintaining section 321 of the command delivery apparatus 320 performs connection target information obtaining processing of the gateway apparatus 500 selected as the connection target (S303) and establishes and maintains a predetermined communication session with the gateway apparatus 500 (S501). The processing described above can provide connection target information of the gateway apparatus 500 as an uncertain destination under control of the network device 400.

After the predetermined communication session with the gateway apparatus 500 is established and maintained, the command delivery apparatus 320 transmits a secure communication connection start command based on the obtained connection target information to the gateway apparatus 500 (S304). The gateway apparatus 500 outputs a secure communication start instruction based on the secure communication connection start command to the secure communication control section (secure communication client) 522 (S502). The secure communication control section 522 transmits a secure communication connection request to the remote access control apparatus 300 and performs processing for establishing a first secure communication session with the secure communication control apparatus 330 of the remote access control apparatus 300 (S503, S305).

After the secure communication control section 522 establishes the first secure communication session, the gateway apparatus 500 transmits the result of the first secure communication establishment to the remote access control apparatus 300 using the mechanism of command delivery (S504). The command delivery apparatus 320 outputs the result of the first secure communication establishment received from the gateway apparatus 500 to the remote management control apparatus 310, transmits the result of the first secure communication establishment to the user request section 121 through the command delivery display section 314, and displays the result on the user apparatus 100 (S306).

The user checks the result of the first secure communication establishment for the selected connection target (S103). Then, the user inputs an instruction for requesting establishment of second secure communication with the remote access control apparatus 300 and outputs the secure communication connection instruction to the secure communication control section 122. It should be noted that the check of the result of the first secure communication establishment by the user can be omitted and the secure communication connection instruction can be automatically output to the secure communication control section 122 based on the received result of the first secure communication establishment. The user apparatus 100 transmits a secure communication connection request to the remote access control apparatus 300 and performs processing for establishing a second secure communication session with the secure communication control apparatus 330 of the remote access control apparatus 300 (S104, S307).

When both of the first secure communication with the local spot and the second secure communication with the user are established, the remote access control apparatus 300 performs processing for determining permission of connection between those secure communication sessions (S308). When it is determined that the connection is permitted (YES at S309) with reference to the session connection permission information, the remote access control apparatus 300 connects the first secure communication session with the second secure communication session (S310) and performs communication session relay processing for relaying remote operation information input from the user apparatus 100 to the gateway apparatus 500 (S105, S311). The gateway apparatus 500 outputs the remote operation information received over the secure communication to the intended remote operation target device 700 or control PC 600. For example in outputting the remote operation information to the remote operation target device 700, the remote management section 523 performs processing for connecting to the remote operation target device 700 within the local network and performs remote relay processing for outputting the remote operation information (S505).

Figure 6:
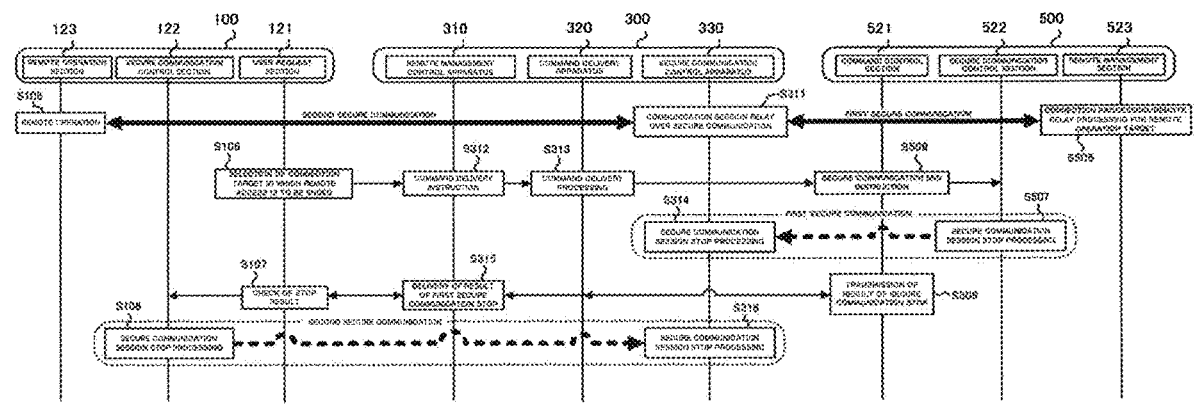
FIG. 6 A flow chart showing processing for stopping secure communication sessions in the remote access control system according to Embodiment 1.

FIG. 6 is a flow chart showing processing for stopping secure communication sessions in the remote access control system.

The user selects, at the user request section 121, a connection target in which remote access is to be ended. The user request section 121 transmits, to the remote access control apparatus 300, a request for ending the remote access to the selected connection target (S106). The command delivery request section 313 outputs a command delivery request for ending the remote access to the selected connection target to the command delivery apparatus 320 (S312). The command delivery apparatus 320 transmits a secure communication connection end command to the gateway apparatus 500 (S313). The gateway apparatus 500 outputs a secure communication end instruction based on the secure communication connection end command to the secure communication control section (secure communication client) 522 (S506). The secure communication control section 522 transmits a secure communication connection stop request to the remote access control apparatus 300 and performs processing for stopping the established first secure communication session with the secure communication control apparatus 330 of the remote access control apparatus 300 (S507, S314).

After the secure communication control section 522 stops the first secure communication session, the gateway apparatus 500 transmits the result of the first secure communication stop to the remote access control apparatus 300 using the mechanism of command delivery (S508). The command delivery apparatus 320 outputs the result of the first secure communication stop received from the gateway apparatus 500 to the remote management control apparatus 310, transmits the result of the first secure communication stop to the user request section 121 through the command delivery display section 314, and displays the result on the user apparatus 100 (S315).

The user checks the result of the first secure communication stop for the connection target in which the remote access is to be ended (S107). Then, the user inputs an instruction for requesting stop of second secure communication with the remote access control apparatus 300, or a secure communication connection end instruction is automatically transmitted to the secure communication control section 122 based on the result of the stop. The user apparatus 100 transmits a secure communication connection end request to the remote access control apparatus 300 and performs processing for stopping the second secure communication session with the secure communication control apparatus 330 of the remote access control apparatus 300 (S108, S316).

As described above, in Embodiment 1, with the remote access control apparatus 300 having the central function, the establishment and stop of the secure communication are performed based on the active request from each secure communication client, and the establishment and stop of the secure communication are not performed based on the active request from the remote access control apparatus 300 to each secure communication client. In the remote access control apparatus 300, for example when a secure communication session is attempted to be established or is established in response to a request other than an active request from the secure communication client, such a session is detected as invalid secure communication, or connection between the first secure communication session and the second secure communication session is prohibited or relay of remote operation information is prohibited even in the pair permitted in the session connection permission information. It is thus possible to achieve improved security in connection and remote operation from the user apparatus 100 to the distant place.

Embodiment 2

FIG. 7 to 11 are diagrams showing a remote access control system according to Embodiment 2. Embodiment 2 applies an access token to the remote access control system according to Embodiment 1 in real time to achieve access control performed when a plurality of users connect to local networks located at distant places. In FIGS. 7 to 11, components identical to those in Embodiment 1 described above are designated with the same reference signs and numerals and detailed description thereof is omitted as appropriate.

Figure 7:
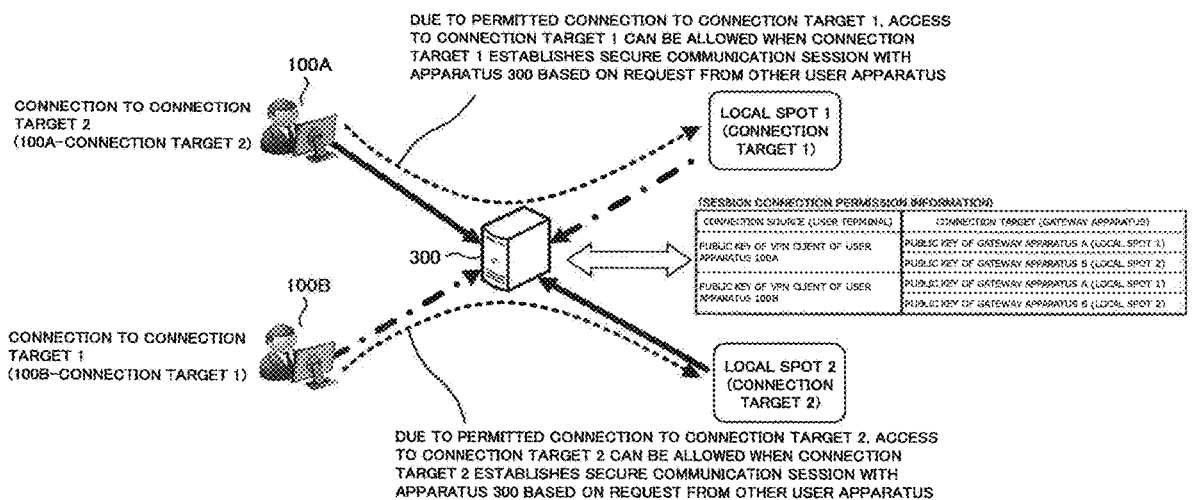
FIG. 7 A diagram for explaining session connection permission processing performed when a plurality of users use the remote access control system according to Embodiment 1 and each of the users remotely accesses a different one of distant places.

FIG. 7 is a diagram for explaining session connection permission processing performed when a plurality of users use the remote access control system according to Embodiment 1 and each of the users remotely accesses a different one of distant places.

As described above, in the remote access control system according to Embodiment 1, the user apparatus 100 connects to each of connection targets located at the different distant places to allow the remote operation. For example, as shown in FIG. 7, it is assumed that session information permission information is set in which both of a user apparatus 100A and a user apparatus 100B are permitted to connect to the same connection targets 1, 2. When the user apparatus 100A selects the connection target 2, the remote access control apparatus 300 maintains secure communication with the connection target 2 and secure communication with the user apparatus 100A and performs session relay over the secure communications between the user apparatus 100A and the connection target 2. When the user apparatus 100B selects the connection target 1, the remote access control apparatus 300 maintains secure communication with the connection target 1 and secure communication with the user apparatus 100B and performs session relay over the secure communications between the user apparatus 100B and the connection target 1.

The remote access control apparatus 300 permits relay between independently established secure communication sessions based on the session connection permission information. When the user apparatus 100A is permitted to connect to the connection target 1, and secure communication between the remote access control apparatus 300 and the connection target 1 is established based on a request from the other user apparatus 100B, then the remote access control apparatus 300 can permit relay between secure communication sessions between the user apparatus 100A and the connection target 1, thereby entering a situation in which the user apparatuses 100A, 100B can simultaneously perform remote operation of the connection target 1. Similarly, a situation may occur in which the user apparatuses 100A, 100B can simultaneously perform remote operation of the connection target 2.

Furthermore, for disconnecting a session with the connection target 2 by the user apparatus 100A, all the sessions relating to the session between the user apparatus 100A and the remote access control apparatus 300 are disconnected, and thus the session between the user apparatus 100B and the connection target 1, which is not necessary to disconnect, is disconnected.

Such simultaneous connection causes interruption from communication of the user apparatus 100B during access of the user apparatus 100A to the connection target 2, address collision, or disconnection of the session with the connection target 2 as well as the connection target 1. To prevent them, when a plurality of users are permitted to connect to different connection targets, access control needs to be performed such that one user is not allowed to connect to a first connection target while the other user is connected to the first connection target.

The remote access control system according to Embodiment 2 does not permit simultaneous connection of two or more user apparatuses 100 to the same connection target. As a result, when two or more user apparatuses 100 establish sessions over secure communication with the remote access control apparatus 300, their connection targets selected by the user apparatuses 100 are different from each other. However, it may be necessary to allow connection from different user apparatuses 100 to the same connection target.

Figure 8:
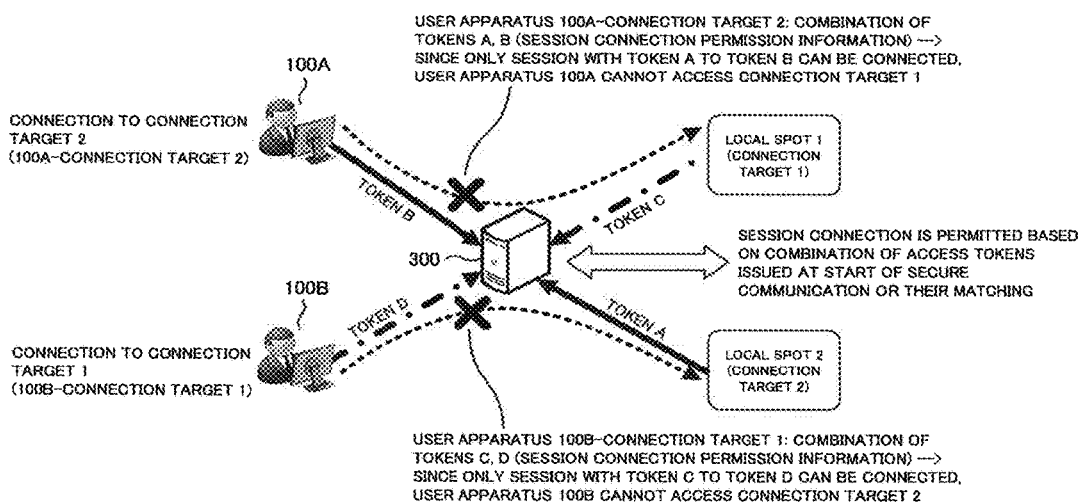
FIG. 8 A diagram for explaining the session connection permission processing in a remote access control apparatus according to Embodiment 2.

To achieve this, in Embodiment 2, an access token is issued to each remote access request from the user apparatus 100 to dynamically link the user apparatus 100 to the connection target. FIG. 8 is a diagram for explaining session connection permission processing (token determination processing) using the access token in the remote access control system according to Embodiment 2.

As shown in FIG. 8, in remote access of the user apparatus 100A to the connection target 2, the remote access control apparatus 300 issues access tokens A, B to a combination of the user apparatus 100A and the connection target 2 and holds the combination of the access tokens A, B as session connection permission information. In the example of FIG. 8, the user apparatus 100A is assigned the access token B, and the connection target 2 is assigned the access token A. Even when the user apparatus 100A is permitted to perform session connection to the connection target 1, the access token A in combination with the access token B is assigned to the connection target 2, so that the remote access control apparatus 300 does not allow secure communication session connection to the connection target 1 but allows and relays only secure communication session connection to the connection target 2.

In remote access of the user apparatus 100B to the connection target 1, the remote access control apparatus 300 issues access tokens C, D to a combination of the user apparatus 100B and the connection target 1 and holds the combination of the access tokens C, D as session connection permission information. In the example of FIG. 8, the user apparatus 100B is assigned the access token D, and the connection target 1 is assigned the access token C. Even when the user apparatus 100B is permitted to perform session connection to the connection target 2, the access token C in combination with the access token D is assigned to the connection target 1, so that the remote access control apparatus 300 does not allow secure communication session connection to the connection target 2 but allows and relays only secure communication session connection to the connection target 1.

As described above, in the example of FIG. 8, when the first secure communication session between the user apparatus 100A and the connection target 2 and the second secure communication session between the user apparatus 100B and the connection target 1 are simultaneously established and relayed, the user apparatus 100B is not permitted to perform session connection to the connection target 2 and no relay is performed between them even when the user apparatus 100B is allowed to perform session connection to the connection target 2 since the first secure communication session is performed by the user apparatus 100A dynamically linked to the connection target 2 based on the combination of the access tones A, B. Similarly, the second secure communication session is performed by the user apparatus 100B dynamically linked to the connection target 1 based on the combination of the access tones C, D, so that the user apparatus 100A is not permitted to perform session connection to the connection target 1 and no relay is performed between them.

As described above, in Embodiment 2, when two or more user apparatuses 100 are allowed to connect to the same connection target, the access tokens are used to dynamically perform one-to-one linking between the user apparatus and the connection target, thereby preventing a situation in which, while the one user apparatus 100 accesses the connection target 1, the communication of the other user apparatus 100 accessing the connection target 2 interrupts the communication of the connection target 1 or address collision occurs.

Figure 9:
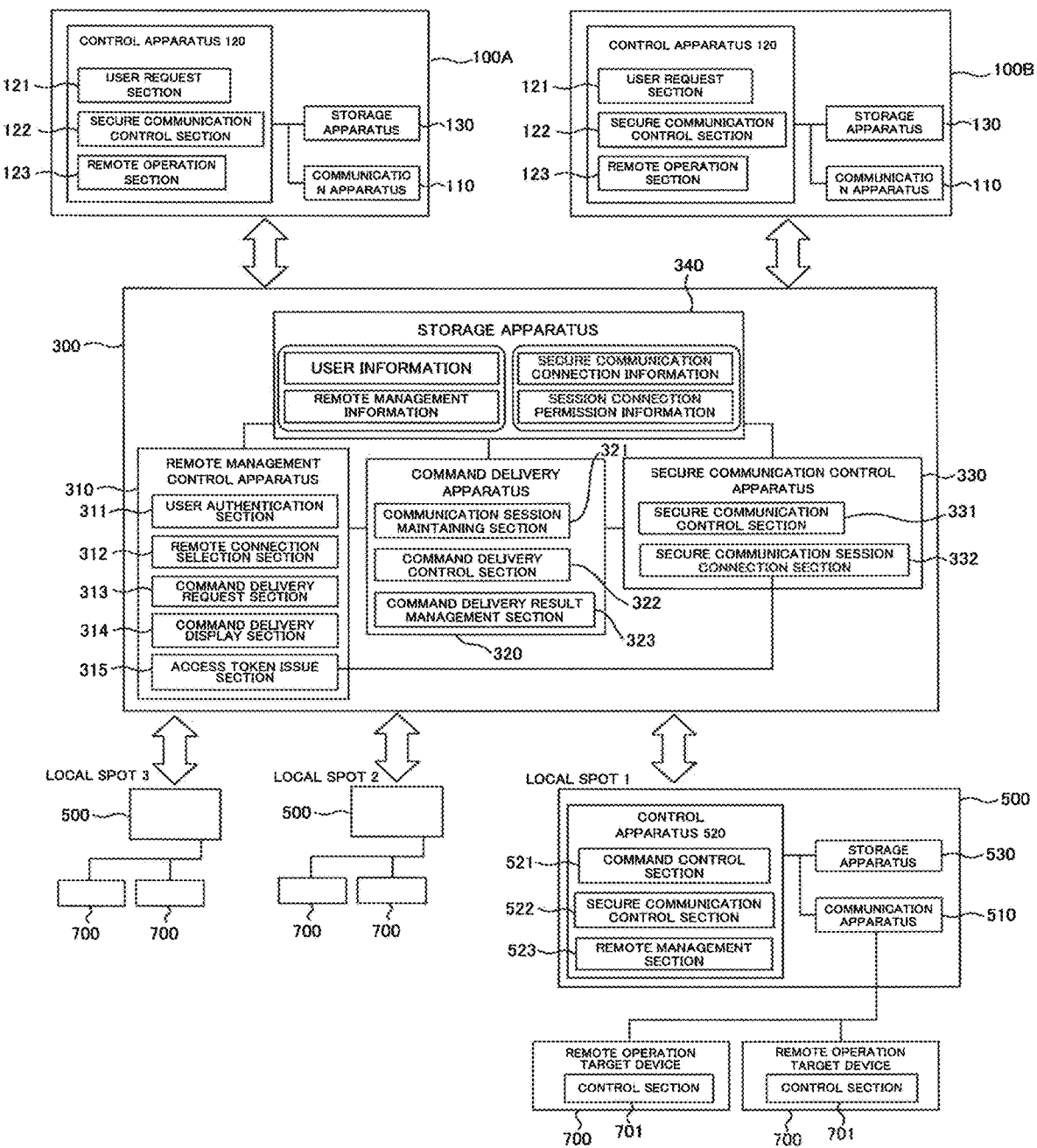
FIG. 9 A functional block diagram showing apparatuses constituting the remote access control system according to Embodiment 2.

FIG. 9 is a functional block diagram showing apparatuses constituting the remote access control system according to Embodiment 2. As compared with Embodiment 1 shown in FIG. 4, the remote management control apparatus 310 further includes an access token issue section 315. The issued (registered) access token is output to the secure communication control apparatus 330. The secure communication session connection section 332 of the secure communication control apparatus 330 performs processing for establishing a first secure communication session with the gateway apparatus 500 and processing for establishing a second secure communication session with the user apparatus 100 using access tokens, and instead of the connection permission determination processing performed in Embodiment 1, performs token determination processing using the access tokens to dynamically perform unique session connection management and relay.

Figure 10:
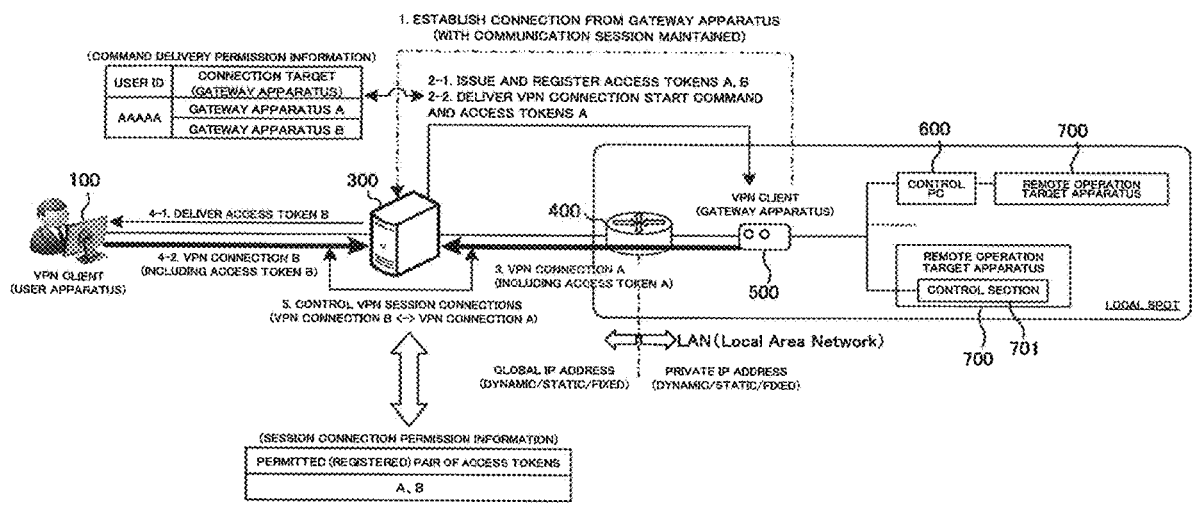
FIG. 10 A diagram for explaining processing for connecting secure communication sessions in the remote access control system according to Embodiment 2.
Figure 11:
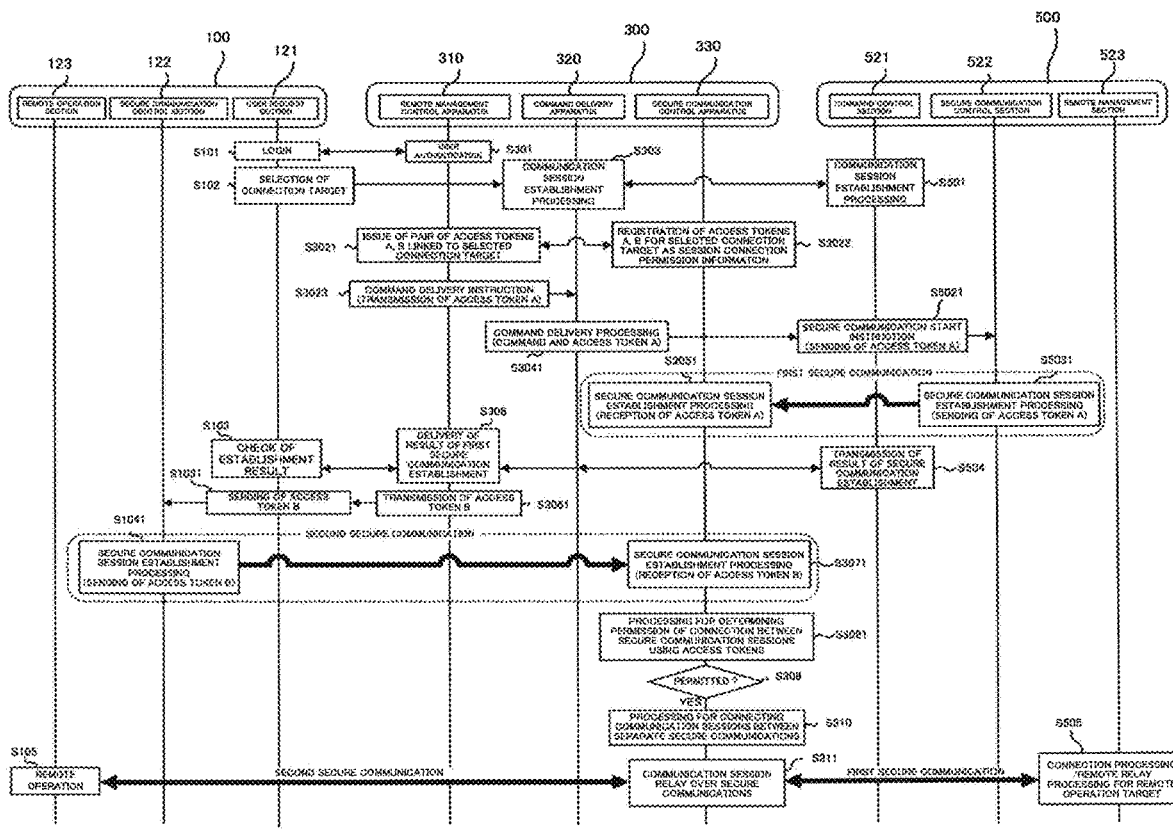
FIG. 11 A flow chart showing processing for establishing and processing for relaying secure communication sessions in the remote access control system according to Embodiment 2.

FIG. 10 is a diagram for explaining processing for connecting secure communication sessions in the remote access control system according to Embodiment 2. FIG. 11 is a flow chart showing processing for establishing and processing for relaying secure communication sessions in the remote access control system according to Embodiment 2.

First, similarly to the example of FIG. 5 in Embodiment 1, after user authentication (S101, S301), selection of a selectable connection target based on command delivery permission information (S102), and processing for obtaining connection target information of a gateway apparatus 500 selected as the connection target (S303, S501), a predetermined communication session is established and maintained with the gateway apparatus 500.

Next, the remote management control apparatus 310 issues (creates) a pair of access tones A, B linked to the selected connection target and the user apparatus 100 and outputs the pair to the secure communication control apparatus 330 (S3021). The secure communication control section 331 registers the issued pair of access tones A, B as session connection permission information using the access tokens (S3022).

As described above, the command delivery permission information in Embodiment 1 includes each user of the user apparatus 100 or each user apparatus 100 associated with a plurality of previously specified connection targets. In Embodiment 2, as shown in FIG. 10, the command delivery permission information is used as access token issue permission information which includes each user of the user apparatus 100 or each user apparatus 100 associated with a plurality of previously specified connection targets. In Embodiment 2, the session connection permission determination processing based on the static session connection permission information in Embodiment 1 is not performed, but the issued access tokens are used as dynamic session connection permission information to perform session connection permission determination processing (token determination processing), and relay of secure communication sessions is dynamically permitted based on the result of token determination.

Thus, the access token issue section 315 refers to the command delivery permission information as the access token issue permission information and creates access tokens for a combination of a connection target to which issue is permitted and the user of the user apparatus or the user apparatus. The access token issue section 315 can determine whether or not issue is permitted based on the access token issue permission information and perform control not to issue an access token (not to receive a connection request) to a non-permitted connection target.

The command delivery request section 313 outputs a command delivery request for the selected connection target and the access token A, which is one of the paired access tokens, to the command delivery apparatus 320 (S3023). The command delivery apparatus 320 transmits a secure communication connection start command including the access token A to the gateway apparatus 500 based on the obtained connection target information (S3041). The gateway apparatus 500 outputs a secure communication start instruction and the access token A to the secure communication control section (secure communication client) 522 based on the secure communication connection start command (S5021). The secure communication connection section 522 transmits a secure communication connection request including the access token A to the remote access control apparatus 300 and performs processing for establishing a first secure communication session with the secure communication control apparatus 330 of the remote access control apparatus 300 (S5031, S3051). In this event, the remote access control apparatus 300 may perform control to reject the processing for establishing a first secure communication session when the secure communication connection request does not include any access token, or to reject the processing for establishing a first secure communication session when the secure communication connection request includes an access token but that access token is not associated with the gateway apparatus 500 registered in the session connection permission information.

The gateway apparatus 500 transmits the result of first secure communication establishment to the remote access control apparatus 300 (S504) and displays the result on the user apparatus (S306). In this event, with delivery of the result of first secure communication establishment, the remote management control apparatus 310 transmits the access token B, which is the pair to the access token A, to the user apparatus 100 (S3061).

The user checks the result of the first secure communication establishment for the selected connection target (S103). In response to input of an instruction of a second secure communication establishment request by the user, or automatically after reception of the result of establishment as a trigger regardless of the check of the user or the input of such an instruction, the user request section 121 outputs a secure communication connection instruction including the access token B to the secure communication control section 122 (S1031). The user apparatus 100 transmits a secure communication connection request including the access token B to the remote access control apparatus 300 and performs processing for establishing a second secure communication session with the secure communication control apparatus 330 of the remote access control apparatus 300 (S1041, S3071).

When both of the first secure communication with the local spot and the second secure communication with the user are established, the remote access control apparatus 300 performs processing for determining permission of connection between those secure communication sessions. Specifically, the remote access control apparatus 300 performs the connection permission determination processing for determining whether or not the pair of the access token received from the gateway apparatus 500 in the first secure communication session establishment processing at step 3051 and the access token from the user apparatus 100 in the second secure communication session establishment processing at step S3071 corresponds to the registered pair of access tokens at step 3022 (S3081).

As described above, the connection permission determination processing in Embodiment 2 is performed between the secure communication sessions using the access tokens and is different from the connection permission determination processing in Embodiment 1. Specifically, in Embodiment 1, it is determined whether or not the user apparatus 100 is permitted to perform session connection to the gateway apparatus 500 with reference to the session connection permission information, whereas in Embodiment 2, the connection permission determination processing for the secure communication sessions is performed by determining the matching of the dynamically issued access tokens based on the session connection permission information for specifying whether or not session connection is permitted.

The configuration described above can dynamically permit one-to-one session connection in view of the matching of the access tokens based on the issue permission without previously providing the session connection permission information statically as in Embodiment 1. Specifically, in Embodiment 2, even when a plurality of users attempt to connect to the same connection target, unique session connection to the connection target can be dynamically managed only by providing each user with access token issue permission for connection targets, thereby preventing a situation in which, while one user apparatus 100 accesses a predetermined connection target, communication of another user apparatus 100 interrupts the communication to the same connection target, address collision occurs, or a session with the connection target 2 is disconnected as well as a session with the connection target 1.

When it is determined that the pair of the access tokens is the registered pair (YES at S309), the remote access control apparatus 300 connects the first secure communication session with the second secure communication session (S310) and performs communication session relay processing for relaying remote operation information input from the user apparatus 100 to the gateway apparatus 500 (S105, S311). The gateway apparatus 500 performs processing for connecting to the remote operation target device 700 within the local network and performs remote relay processing for outputting the remote operation information (S505).

The pair of access tokens is described as an example of the access token. Alternatively, the same access token, that is, a single access token may be used such that session connection permission processing is performed by determining whether or not an access token transmitted to the gateway apparatus 500 and received from the gateway apparatus 500 matches an access token transmitted to the user apparatus 100 and received from the user apparatus 100. In addition, the access token may have a valid period similarly to a one-time password, and connection of secure communication may be rejected after the lapse of the valid period since registration in the secure communication control apparatus 330.

The remote access control system according to Embodiment 2 can be applied to a mechanism in which a plurality of users remotely access a plurality of connection targets over secure communication regardless of whether or not the gateway apparatus 500 is an uncertain target. In an aspect which does not include the connection target information obtaining processing in Embodiment 1 and the associated functions thereof, the remote access control system (remote access control apparatus 300) can be configured.

As described above, the remote access control system according to Embodiment 2 can achieve the dynamic session connection management and relay using the access token instead of the session connection management and relay mechanism based on the session connection permission information in Embodiment 1.

While the remote access control system according to Embodiments 1 and 2 have been described, the user apparatus 100 includes a mobile communication terminal device such as a multifunctional cellular phone or a PDA (Personal Digital Assistant), and an information processing terminal device such as a personal computer having a communication function and a computing function. The user apparatus 100 can have a browser function for displaying information or screens output from the remote access control apparatus 300 and the remote operation target device 700.

The remote access control apparatus 300 can include hardware components other than those described above, such as a CPU responsible for overall control of the apparatus (the respective components), a memory (main storage device), operation input means such as a mouse, a keyboard, or a touch panel, output means such as a printer or a speaker, and an auxiliary storage device (such as a hard disk).

The functions of the present invention can be implemented by a program. A computer program previously provided for implementing each function can be stored on an auxiliary storage apparatus, the program stored on the auxiliary storage apparatus can be read by a control section such as a CPU to a main storage apparatus, and the program read to the main storage apparatus can be executed by the control section to allow the remote access control apparatus 300 and the communication relay apparatus 500 to perform the function of each component in the present invention. The functions of the present invention can also be provided by different control apparatuses and those control apparatuses can be connected directly or through a network to constitute the remote access control apparatus 300.

The program may be recorded on a computer readable recording medium and provided for the computer. Examples of the computer readable recording medium include optical disks such as a CD-ROM, phase-change optical disks such as a DVD-ROM, magneto-optical disks such as a Magnet-Optical (MO) disk and Mini Disk (MD), magnetic disks such as a floppy Disk® and removable hard disk, and memory cards such as a compact Flash®, smart media, SD memory card, and memory stick. Hardware apparatuses such as an integrated circuit (such as an IC chip) designed and configured specifically for the purpose of the present invention are included in the recording medium.

While the embodiments of the present invention have been described, the embodiments are only illustrative and are not intended to limit the scope of the present invention. The novel embodiments can be implemented in various other forms, and various omissions, substitutions, and modifications can be made thereto without departing from the spirit or scope of the present invention. The embodiments and their variations are encompassed within the spirit or scope of the present invention and within the invention set forth in the claims and the equivalents thereof.

DESCRIPTION OF THE REFERENCE NUMERALS

100 USER APPARATUS
110 COMMUNICATION APPARATUS
120 CONTROL APPARATUS
121 USER REQUEST SECTION
122 SECURE COMMUNICATION CONTROL SECTION
123 REMOTE OPERATION SECTION
130 STORAGE APPARATUS
300 REMOTE ACCESS CONTROL APPARATUS

310 REMOTE MANAGEMENT CONTROL APPARATUS
311 USER AUTHENTICATION SECTION
312 REMOTE CONNECTION SELECTION SECTION
313 COMMAND DELIVERY REQUEST SECTION
314 COMMAND DELIVERY DISPLAY SECTION
315 ACCESS TOKEN ISSUE SECTION
320 COMMAND DELIVERY APPARATUS
321 COMMUNICATION SESSION MAINTAINING SECTION
322 COMMAND DELIVERY CONTROL SECTION
323 COMMAND DELIVERY RESULT MANAGEMENT SECTION
330 SECURE COMMUNICATION CONTROL APPARATUS
331 SECURE COMMUNICATION CONTROL SECTION
332 SECURE COMMUNICATION SESSION CONNECTION SECTION
340 STORAGE APPARATUS
400 NETWORK DEVICE
500 GATEWAY APPARATUS
510 COMMUNICATION APPARATUS
520 CONTROL APPARATUS
521 COMMAND CONTROL SECTION
522 SECURE COMMUNICATION CONTROL SECTION
523 REMOTE MANAGEMENT SECTION
530 STORAGE APPARATUS
600 CONTROL PC
700 REMOTE OPERATION TARGET DEVICE
701 CONTROL SECTION

The invention claimed is:

1. A remote access control system for controlling remote access to each of connection targets located at distant places over secure communication, comprising:
 a remote access control apparatus connected to a user apparatus; and
 a communication relay apparatus under control of a network device and belonging to a local network including a remote operation target device located at each of the connection targets, the network device being configured to perform network address translation between a network associated with the remote access control apparatus and the local network,
 wherein the remote access control apparatus includes a processor configured to operate as:
 a communication session maintaining section configured to establish a predetermined communication session with the communication relay apparatus located at the connection target through predetermined connection target information obtaining processing performed by active connection to the remote access control apparatus from the communication relay apparatus;
 a command delivery section configured to transmit a secure communication connection start command to the communication relay apparatus with the predetermined communication session maintained;
 a secure communication control section configured to receive a secure communication connection request transmitted from the communication relay apparatus based on the secure communication connection start command to perform processing for establishing a first secure communication session between the communication relay apparatus and the remote access control apparatus, and to receive a secure communication connection request transmitted from the user apparatus based on a result of the establishment of the first secure communication session to perform processing for establishing a second secure communication session between the user apparatus and the remote access control apparatus; and
 a secure communication session connection section configured to perform determination of permission of connection between the established first secure communication session and second secure communication session based on session connection permission information indicating permission of session connection between the user apparatus or a user of the user apparatus and the connection target, and to connect the first secure communication session and the second secure communication session based on a result of the determination to perform relay of the secure communication sessions,
 wherein the command delivery section is configured to transmit a secure communication connection end command to the communication relay apparatus based on a remote access end request for the connection target transmitted from the user apparatus, and
 the secure communication control section is configured to receive a secure communication connection stop request transmitted from the communication relay apparatus based on the secure communication connection end command to perform processing for stopping the first secure communication session established between the communication relay apparatus and the remote access control apparatus, and to receive a secure communication connection stop request transmitted from the user apparatus based on a result of the stop of the first secure communication session to perform processing for stopping the second secure communication session established between the user apparatus and the remote access control apparatus.

2. The remote access control system according to claim 1, wherein the communication relay apparatus includes:
 a command control section configured to receive the secure communication connection start command, and
 a secure communication control section associated with the communication relay apparatus configured to transmit the secure communication connection request to the remote access control apparatus based on a secure communication start instruction output from the command control section to perform processing for establishing the first secure communication session with the remote access control apparatus, and
 the command control section is configured to transmit, to the remote access control apparatus, the result of the establishment indicating that the first secure communication session is established by the secure communication control section associated with the communication relay apparatus.

3. The remote access control system according to claim 1, wherein the session connection permission information is information including first unique information preset for uniquely identifying the user apparatus associated with second unique information preset for uniquely identifying the communication relay apparatus located at each of the connection targets.

4. A remote access control system for controlling remote access to each of connection targets located at distant places over secure communication, comprising:
 a remote access control apparatus connected to a user apparatus; and
 a communication relay apparatus under control of a network device and belonging to a local network including a remote operation target device located at each of the connection targets, the network device being configured to perform network address translation between a network associated with the remote access control apparatus and the local network, wherein the remote access control apparatus includes a processor configured to operate as:

a communication session maintaining section configured to establish a predetermined communication session with the communication relay apparatus located at the connection target through predetermined connection target information obtaining processing performed by active connection to the remote access control apparatus from the communication relay apparatus;

a command delivery section configured to transmit a secure communication connection start command to the communication relay apparatus with the predetermined communication session maintained;

a secure communication control section configured to receive a secure communication connection request transmitted from the communication relay apparatus based on the secure communication connection start command to perform processing for establishing a first secure communication session between the communication relay apparatus and the remote access control apparatus, and to receive a secure communication connection request transmitted from the user apparatus based on a result of the establishment of the first secure communication session to perform processing for establishing a second secure communication session between the user apparatus and the remote access control apparatus; and a secure communication session connection section configured to perform determination of permission of connection between the established first secure communication session and second secure communication session based on session connection permission information indicating permission of session connection between the user apparatus or a user of the user apparatus and the connection target, and to connect the first secure communication session and the second secure communication session based on a result of the determination to perform relay of the secure communication sessions, wherein the remote access control apparatus further includes an access token issue section configured to dynamically create an access token for a combination of the connection target and the user apparatus or the user of the user apparatus, the dynamically created access token is configured to be registered as the session connection permission information, the command delivery section is configured to transmit the secure communication connection start command including the access token to the communication relay apparatus and to transmit the result of the establishment of the first secure communication session including the access token to the user apparatus, the secure communication control section is configured to receive the secure communication connection request including the access token transmitted from the communication relay apparatus to perform processing for establishing the first secure communication session, and to receive the secure communication connection request including the access token transmitted from the user apparatus to perform processing for establishing the second secure communication session, and the secure communication session connection section is configured to perform token determination processing for determining whether or not the access token received from the communication relay apparatus in the processing for establishing the first secure communication session and the access token received from the user apparatus in the processing for establishing the second secure communication session correspond to the access token registered in the session connection permission information, and to connect the first secure communication session and the second secure communication session based on a result of the token determination processing to perform relay of the secure communication sessions.

5. The remote access control system according to claim 4, wherein the command delivery section is configured to transmit the secure communication connection start command to the communication relay apparatus permitted based on command delivery permission information in which each user apparatus or each user of the user apparatus is associated with a plurality of preset connection targets, and the access token issue section is configured to dynamically create an access token for a combination of one of the connection targets and the user apparatus or the user of the user apparatus permitted in the command delivery permission information and to register the created access token in the session connection permission information.

6. The remote access control system according to claim 4, wherein the communication relay apparatus includes:

a command control section configured to receive the secure communication connection start command, and a secure communication control section associated with the communication relay apparatus configured to transmit the secure communication connection request to the remote access control apparatus based on a secure communication start instruction output from the command control section to perform processing for establishing the first secure communication session with the remote access control apparatus, and the command control section is configured to transmit, to the remote access control apparatus, the result of the establishment indicating that the first secure communication session is established by the secure communication control section associated with the communication relay apparatus.

7. The remote access control system according to claim 4, wherein the command delivery section is configured to transmit a secure communication connection end command to the communication relay apparatus based on a remote access end request for the connection target transmitted from the user apparatus, and the secure communication control section is configured to receive a secure communication connection stop request transmitted from the communication relay apparatus based on the secure communication connection end command to perform processing for stopping the first secure communication session established between the communication relay apparatus and the remote access control apparatus, and to receive a secure communication connection stop request transmitted from the user apparatus based on a result of the stop of the first secure communication session to perform processing for stopping the second secure communication session established between the user apparatus and the remote access control apparatus.

8. The remote access control system according to claim 4, wherein the session connection permission information is information including first unique information preset for uniquely identifying the user apparatus associated with second unique information preset for uniquely identifying the communication relay apparatus located at each of the connection targets.

9. A computer program product including a non-transitory computer readable medium and computer executable instructions stored thereon and executed by a remote access control apparatus including the remote access control apparatus connected to a user apparatus and a communication relay apparatus under control of a network device and belonging to a local network including a remote operation target device, the network device being configured to perform network address translation between a network associated with the remote access control apparatus and the local network, the remote access control apparatus being configured to control remote access to each of connection targets located at distant places over secure communication through the communication relay apparatus, the computer executable instructions comprising instructions which, when executed by the remote access control apparatus, cause the remote access control apparatus to provide:

a first function of establishing a predetermined communication session with the communication relay apparatus through predetermined connection target information obtaining processing performed by active connection to the remote access control apparatus from the communication relay apparatus located at the connection target;

a second function of transmitting a secure communication connection start command to the communication relay apparatus with the predetermined communication session maintained;

a third function of receiving a secure communication connection request transmitted from the communication relay apparatus based on the secure communication connection start command to perform processing for establishing a first secure communication session between the communication relay apparatus and the remote access control apparatus, and receiving a secure communication connection request transmitted from the user apparatus based on a result of the establishment of the first secure communication session to perform processing for establishing a second secure communication session between the user apparatus and the remote access control apparatus; and a fourth function of performing determination of permission of connection between the established first secure communication session and second secure communication session based on session connection permission information indicating permission of session connection between the user apparatus or a user of the user apparatus and the connection target, and connecting the first secure communication session and the second secure communication session based on a result of the determination to perform relay of the secure communication sessions, wherein the second function transmits a secure communication connection end command to the communication relay apparatus based on a remote access end request for the connection target transmitted from the user apparatus, and the third function receives a secure communication connection stop request transmitted from the communication relay apparatus based on the secure communication connection end command to perform processing for stopping the first secure communication session established between the communication relay apparatus and the remote access control apparatus, and to receive a secure communication connection stop request transmitted from the user apparatus based on a result of the stop of the first secure communication session to perform processing for stopping the second secure communication session established between the user apparatus and the remote access control apparatus.

10. A computer program product including a non-transitory computer readable medium and computer executable instructions stored thereon and executed by a remote access control apparatus including the remote access control apparatus connected to a user apparatus and a communication relay apparatus under control of a network device and belonging to a local network including a remote operation target device, the network device being configured to perform network address translation between a network associated with the remote access control apparatus and the local network, the remote access control apparatus being configured to control remote access to each of connection targets located at distant places over secure communication through the communication relay apparatus, the computer executable instructions comprising instructions which, when executed by the remote access control apparatus, cause the remote access control apparatus to provide:

a first function of establishing a predetermined communication session with the communication relay apparatus through predetermined connection target information obtaining processing performed by active connection to the remote access control apparatus from the communication relay apparatus located at the connection target;

a second function of transmitting a secure communication connection start command to the communication relay apparatus with the predetermined communication session maintained;

a third function of receiving a secure communication connection request transmitted from the communication relay apparatus based on the secure communication connection start command to perform processing for establishing a first secure communication session between the communication relay apparatus and the remote access control apparatus, and receiving a secure communication connection request transmitted from the user apparatus based on a result of the establishment of the first secure communication session to perform processing for establishing a second secure communication session between the user apparatus and the remote access control apparatus;

a fourth function of performing determination of permission of connection between the established first secure communication session and second secure communication session based on session connection permission information indicating permission of session connection between the user apparatus or a user of the user apparatus and the connection target, and connecting the first secure communication session and the second secure communication session based on a result of the determination to perform relay of the secure communication sessions; and a fifth function to dynamically create an access token for a combination of the connection target and the user apparatus or the user of the user apparatus, the dynamically created access token is configured to be registered as the session connection permission information, the second function transmits the secure communication connection start command including the access token to the communication relay apparatus and to transmit the result of the establishment of the first secure communication session including the access token to the user apparatus, the third function receives the secure communication connection request including the access token transmitted from the communication relay apparatus to perform processing for establishing the first secure communication session, and to receive the secure communication connection request including the access token transmitted from the user apparatus to perform processing for establishing the second secure communication session, and the fourth function performs token determination processing for determining whether or not the access token received from the communication relay apparatus in the processing for establishing the first secure communication session and the access token received from the user apparatus in the processing for establishing the second secure communication session correspond to the access token registered in the session connection permission information, and to connect the first secure communication session and the second secure communication session based on a result of the token determination processing to perform relay of the secure communication sessions.

* * * * *